T. B. WOODWARD.
Mill Spindle.
No. 11,309.
Patented July 11, 1854.
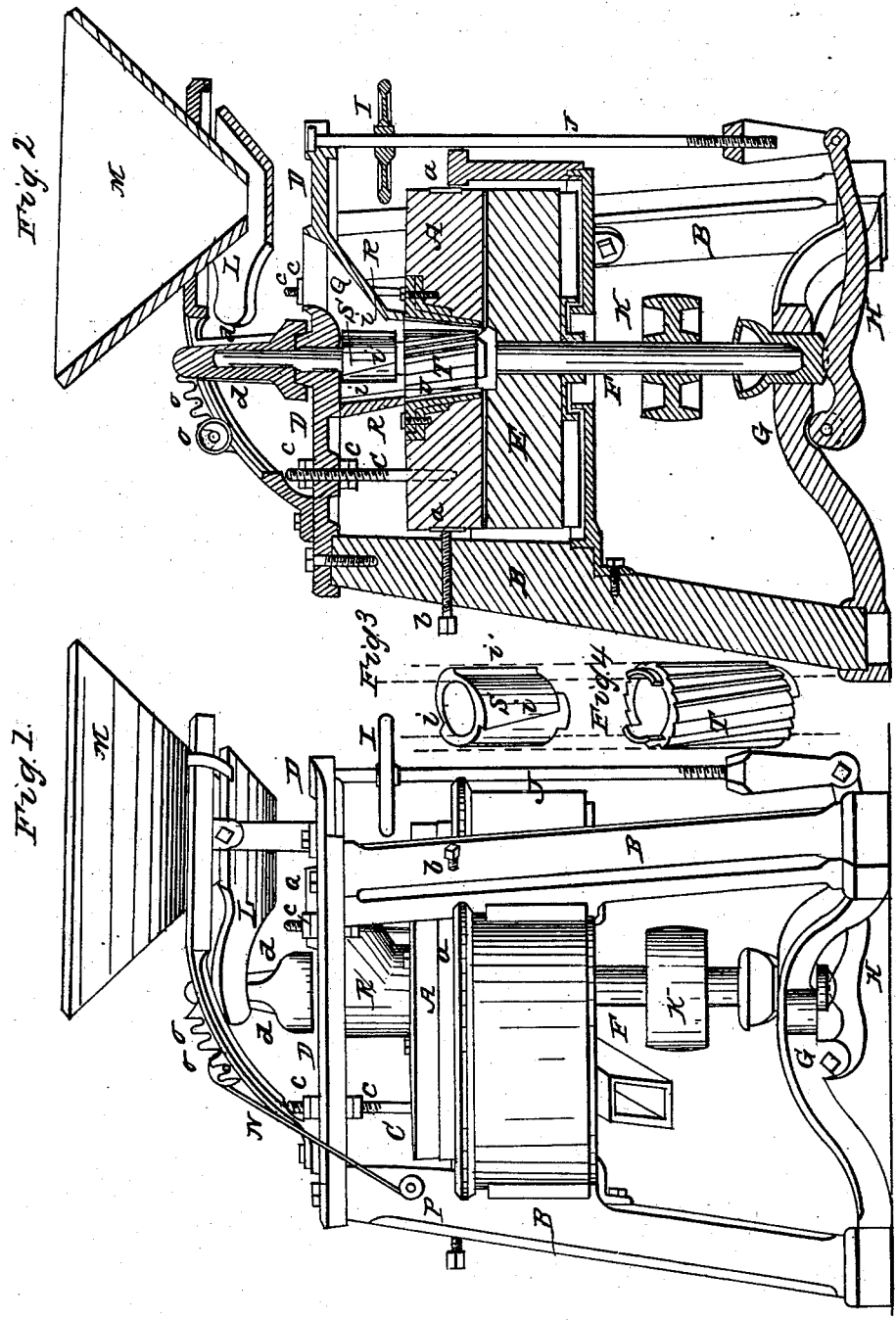

UNITED STATES PATENT OFFICE.

THOMAS B. WOODWARD, OF KENSINGTON, PENNSYLVANIA.

MILL FOR GRINDING.

Specification of Letters Patent No. 11,309, dated July 11, 1854.

*To all whom it may concern:*

Be it known that I, THOMAS B. WOODWARD, of Kensington, in the county of Philadelphia and State of Pennsylvania, have invented certain new and useful Improvements in Mills for Grinding, of which the following is a full, clear, and exact description, reference being had to the accompanying drawings, which form part of this specification, and in which—

Figure 1 represents an elevation of my improved mill; Fig. 2 a vertical section thereof; and Figs. 3 and 4 views in perspective of the central bruising or crushing nuts.

The various grist mills in use are all more or less defective in their arrangements for cracking and bruising the grain, preparatorily to its being floured, and the same defects are common to the cracking apparatus of other mills of similar construction for grinding drugs, paints and other substances.

To cure this defect is the object of my invention.

In the grist mill represented in the drawings, the upper or stationary stone (A) is secured in a hoop or ring (a) adjusted by set screws (b) to hold the stone in the proper position horizontally. These set screws project through the posts (B) of the frame of the mill; they serve in conjunction with vertical bolts (C), to hold the upper stone which may be set to the requisite elevation by screw nuts (c) the vertical bolts (C) being fast at their bottom to the stone and secured at their tops by the screw nuts to a bridge (D). The lower stone or runner (E) is made fast to the spindle (F) which is guided in bearings through the bridges (D and G) that connect the upper and lower ends of the posts (B) of the frame; the spindle (F) is allowed vertical play in its bearings and is supported or carried by a bridge tree (H) which may be raised or lowered to regulate the distance of the face of the runner from that of the upper stone by means of a hand wheel (I) and screw rod (J). Both stones (A and E) have their faces dressed in the usual or any appropriate manner. Motion is communicated to the runner by a belt passing round a pulley (K) on the spindle. The shoe (L) which receives the grist from the hopper (M) is suspended loosely at its back and supported at any required dip at its front by a cord (N) which is passed over a grooved roller (O) and wound round a tightening peg (P); this shoe has the usual shake or vibratory action given it, to facilitate its delivery of the grain to the stones, by means of ribs (d) which project from a cap on the spindle, and which as they rotate strike an inclined projection attached to the shoe; the amount of vibratory action of the shoe and its set or dip may be varied to vary the feed, either by tightening or slackening the cord, varying the direction of the cord by passing it over any of the circumferential grooves in the roller, or by altering the position of the roller along the rack strips (e) which carry it; these several arrangements for adjusting the shoe allow of the feed being regulated to the greatest nicety.

The grain is delivered from the shoe down a spout or passage (Q) through the upper bridge (D) into a stationary cylinder or frustum of an inverted cone (R) where it is bruised or cracked by a revolving cylindrical nut (S); the adjacent surfaces of the cylindrical nut and the cylinder (R) in which it works are armed with ribs or teeth (i), which as the nut (S) rotates together with the spindle (F) which drives it, break or bruise the grain between them as it passes downward to the stones. The teeth of the cylinder (R) may be vertical and more numerous than those of the revolving nut, the teeth of which are represented as slightly inclined, in order to facilitate the cracking of the grain and work it toward the stones; but the grain thus cracked or bruised is further reduced, or coarsely ground, by an under nut (T) and cylinder (U) situated in the eye of the top or stationary stone, before it passes down between the stones to be floured. This second cylinder which is fitted in the upper stone and the nut (T) that works within it are similar in their construction to the upper bruising cylinder and nut, but have finer teeth in order to divide still further the grain, already cracked and broken by the passing between the upper nut and cylinder. Both nuts (S and T) are fitted loosely in the manner of ferrules on the spindle which drives the lower one by clutch lips that gear as the nut is passed down the shaft to its position, while the upper nut is driven by the lower one by similar clutch connections; this mode of attaching the nuts, admits readily of their removal either for the purpose of repair or substituting others, the teeth of which may be cut to suit particular descriptions of work. The cylinders also in which the nuts work may be fitted so as to be readily removable for like purposes.

Now it will be readily perceived that the face of the running stone may be raised to closer proximity with that of the stationary stone, as wear or fineness of grinding may require, or that the runner may be lowered for coarser grinding, without producing any alteration in the relative position, arrangement, or action of the working faces of the nuts and cylinders, for, by reason of the nuts being cylindrical, their elevation or depression with the spindle, causes no alteration in the distance apart of the bruising or grinding teeth.

As the cracking or grinding surfaces of the nuts and their cylinders may be increased as desired by giving them additional height without enlarging their diameter, it is obvious that a large effective bruising surface may be obtained in mills having stones of small diameter, and that, as the grain may first be cracked and afterward coarsely ground before it is introduced between the stones, the flouring only of the grain will have to be effected by the stones which consequently may be of small diameter and therefore will take a comparatively small amount of driving power, light, and easy to transport and manage. Any number of bruising and grinding nuts and their cylinders may be arranged in succession one above the other or one nut and cylinder only may be used according to the peculiar requirements of the mill or nature of the substance to be ground.

What I claim as my invention and desire to secure by Letters Patent, is—

The combination and arrangement of one or more cylindrical bruising or grinding nuts and chambers or cylinders, with the stones of the mill in such manner that the relative distance of the stones to each other may be varied without increasing or diminishing the distance of the acting surfaces of the nuts and cylinders substantially as specified.

In testimony whereof, I have hereunto subscribed my name.

THOS. B. WOODWARD.

Witnesses:
A. H. SHOEMAKER,
ENOS FISHER.